United States Patent
Zheng

(10) Patent No.: US 10,990,132 B2
(45) Date of Patent: Apr. 27, 2021

(54) ELECTRONIC DEVICE

(71) Applicant: WUHAN CHINA STAR OPTOELECTRONICS SEMICONDUCTOR DISPLAY TECHNOLOGY CO., LTD., Wuhan (CN)

(72) Inventor: Min Zheng, Wuhan (CN)

(*) Notice: Subject to any disclaimer, the term of this patent is extended or adjusted under 35 U.S.C. 154(b) by 0 days.

(21) Appl. No.: 16/608,869

(22) PCT Filed: Mar. 12, 2019

(86) PCT No.: PCT/CN2019/077858
§ 371 (c)(1),
(2) Date: Oct. 28, 2019

(87) PCT Pub. No.: WO2020/151061
PCT Pub. Date: Jul. 30, 2020

(65) Prior Publication Data
US 2020/0401189 A1 Dec. 24, 2020

(30) Foreign Application Priority Data
Jan. 25, 2019 (CN) .......................... 201910075283.9

(51) Int. Cl.
*G06F 1/16* (2006.01)
*H04M 1/02* (2006.01)

(52) U.S. Cl.
CPC ........ *G06F 1/1652* (2013.01); *H04M 1/0264* (2013.01); *H04M 1/0266* (2013.01)

(58) Field of Classification Search
CPC .... H04M 1/02; H04M 1/0264; H04M 1/0266; H04M 1/0268; G06F 1/1652; G06F 1/1656; G06F 3/041; G06F 9/301
See application file for complete search history.

(56) References Cited

U.S. PATENT DOCUMENTS

| | | | |
|---|---|---|---|
| 9,936,138 B2* | 4/2018 | Park | G06F 1/1652 |
| 10,222,835 B2* | 3/2019 | Lim | G06F 1/1652 |
| 10,523,799 B1* | 12/2019 | Zheng | G06F 1/1686 |
| 10,782,878 B2* | 9/2020 | Gao | G06F 1/1681 |
| 2015/0257289 A1 | 9/2015 | Lee et al. | |
| 2016/0007441 A1* | 1/2016 | Matsueda | H01L 51/0097 361/749 |

(Continued)

FOREIGN PATENT DOCUMENTS

CN   104900153 A   9/2015
CN   104994192 A   10/2015

(Continued)

*Primary Examiner* — Matthew C Sams

(57) ABSTRACT

An electronic device is provided, including: a display screen provided with a first surface and a second surface arranged oppositely, the display screen including: a primary display screen comprising a first portion disposed on the first surface and a second portion extending from a portion connected to the first portion to the second surface, wherein the second portion is connected to a portion of the first portion; and a secondary display screen connected to a remaining portion of the first portion, the secondary display screen being bent from a first surface of the portion connected to the first portion to the second surface.

18 Claims, 5 Drawing Sheets

(56) References Cited

U.S. PATENT DOCUMENTS

| | | | |
|---|---|---|---|
| 2016/0026219 A1* | 1/2016 | Kim | G06F 1/1652 345/173 |
| 2016/0105542 A1* | 4/2016 | Lee | G06F 3/04886 455/566 |
| 2016/0291642 A1 | 10/2016 | Kwak et al. | |
| 2017/0126983 A1 | 5/2017 | Yamazaki et al. | |
| 2018/0164852 A1* | 6/2018 | Lim | H04M 1/0214 |
| 2018/0324964 A1* | 11/2018 | Yoo | G06F 1/1652 |
| 2019/0215390 A1 | 7/2019 | Liu et al. | |
| 2019/0379773 A1* | 12/2019 | Zheng | G06F 1/1626 |
| 2019/0386040 A1 | 12/2019 | Wang et al. | |
| 2020/0020752 A1 | 1/2020 | Shi et al. | |
| 2020/0076940 A1* | 3/2020 | Kim | H04M 1/724 |

FOREIGN PATENT DOCUMENTS

| | | |
|---|---|---|
| CN | 106355999 A | 1/2017 |
| CN | 107579171 A | 1/2018 |
| CN | 107910335 A | 4/2018 |
| CN | 108111650 A | 6/2018 |
| CN | 108650364 A | 10/2018 |
| CN | 108924291 A | 11/2018 |

\* cited by examiner

ELECTRONIC DEVICE

FIELD OF INVENTION

The present invention generally relates to the display technology and, more particularly, to an electronic device.

BACKGROUND OF INVENTION

With the advancement of the display technology, the user has higher requirements on the screen ratio of a display screen. Therefore, it has become a research hotspot to increase the area of the display area.

The conventional display screen can only be used for display on the front side, and cannot be used for display on the back side. For example, the back side is usually provided with a back cover thereon, so that the entire back side is a non-display area, resulting in a small display area that fails to achieve high screen ratio display.

Therefore, there is a need to provide an electronic device capable of solving the problems in the prior art.

SUMMARY OF INVENTION

One object of the present invention is to provide an electronic device capable of increasing the display area to achieve high screen ratio display.

In order to solve the foregoing technical problems, the present invention provides an electronic device including:

a display screen provided with a first surface and a second surface arranged oppositely, the display screen comprising:

a primary display screen comprising a first portion disposed on the first surface and a second portion extending from a portion connected to the first portion to the second surface, wherein the second portion is connected to a portion of the first portion; and a secondary display screen connected to a remaining portion of the first portion, the secondary display screen being bent from a first surface of the portion connected to the first portion to the second surface, one side of the secondary display screen being connected to the remaining portion of the first portion, and the width of the secondary display screen being smaller than the width of the primary display screen.

The present invention provides an electronic device including:

a display screen provided with a first surface and a second surface arranged oppositely, the display screen comprising:

a primary display screen comprising a first portion disposed on the first surface and a second portion extending from a portion connected to the first portion to the second surface, wherein the second portion is connected to a portion of the first portion; and a secondary display screen connected to a remaining portion of the first portion, the secondary display screen being bent from a first surface of the portion connected to the first portion to the second surface.

In the electronic device according to the present invention, one side of the secondary display screen is connected to the remaining portion of the first portion.

In the electronic device according to the present invention, the portion connected to the first portion and the secondary display screen is disposed in a central portion at the top of the first portion, the second portion extends from edge regions on two sides of the first portion to the second surface, and the edge regions are disposed on one of the two sides of the portion connected to the primary display screen and the secondary display screen.

In the electronic device according to the present invention, the primary display screen is provided with an opening disposed between the edge regions.

In the electronic device according to the present invention, the opening is disposed in a curved portion between the first portion and the second portion.

In the electronic device according to the present invention, the electronic device further includes a function module disposed corresponding to the opening, and the function module includes at least one of a first camera module, a second camera module, an earpiece, and a sensor element.

In the electronic device according to the present invention, the curved portion on both sides of the opening is provided with touch keys disposed thereon.

In the electronic device according to the present invention, the opening is disposed at the top or the bottom of the display screen.

In the electronic device according to the present invention, an end portion of the second portion distant from the first portion abuts the secondary display screen.

In the electronic device according to the present invention, the width of the secondary display screen is smaller than the width of the primary display screen.

In the electronic device according to the present invention, the entire display screen is divided into a primary display screen and a secondary display screen. The primary display screen and the secondary display screen are bent backward, so that both the front and rear screens after bending are used for display. In other words, a display area is added to the back surface of the display, which increases the total display area and achieves high screen ratio display.

DETAILED DESCRIPTION OF PREFERRED EMBODIMENTS

Figure 1:
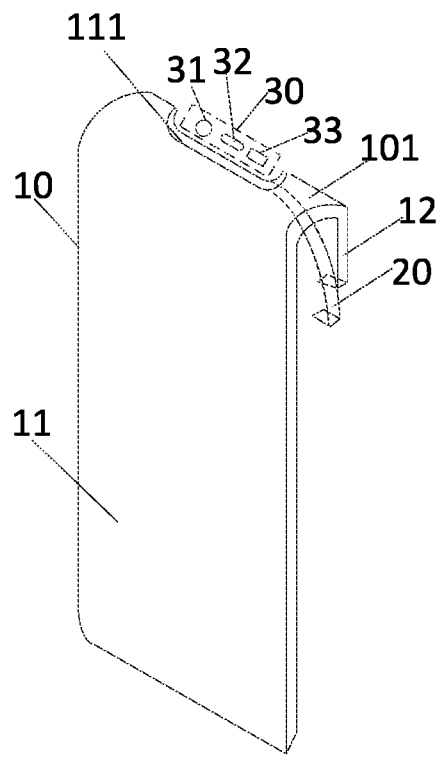
FIG. 1 is a schematic structural view of an electronic device according to the present invention.

The following descriptions of the various embodiments with reference to the accompanying drawings exemplify particular embodiments of the present invention. The directional terms mentioned in this specification, such as "upper", "lower", "front", "rear", "left", "right", "inner", "outer", "side", etc., only illustrate the directions in the accompanying drawings. Therefore, the directional terms are used for the purpose of illustration and understanding of the present invention, instead of limiting the present invention. In the drawings, like reference numerals represent the same structural elements.

Referring to FIG. 1 to FIG. 6, FIG. 1 is a schematic structural view of an electronic device according to the present invention.

Figure 2:
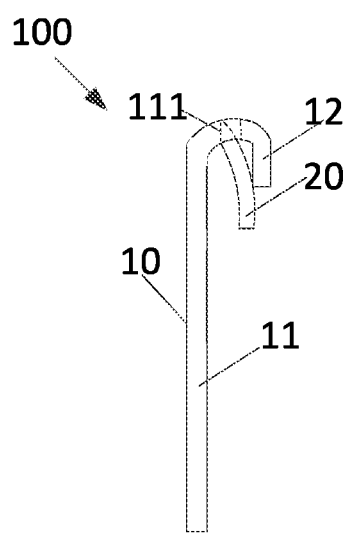
FIG. 2 is a side view of an electronic device according to the present invention.
Figure 3:
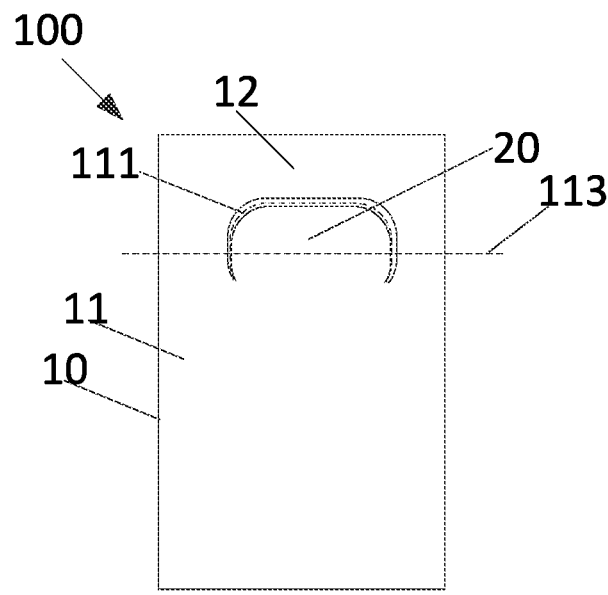
FIG. 3 is a schematic structural view of a display screen in a planar state according to the present invention.

In FIG. 1 to FIG. 3, the electronic device of the present embodiment includes a display screen 100 including a curved primary display screen 10 and a curved secondary display screen 20. The display screen 100 is provided with a first (front) surface and a second (back) surface arranged oppositely. The display screen 10 in the present embodiment is acquired by cutting and bending a planar display screen. Specifically, a cutting line 111 (shown by a dotted line in the figure) is provided on the planar display screen 100 to cut the display screen 100 into a primary display screen 10 and a secondary display screen 20. The primary display screen 10 and the secondary display screen 20 are then bent backward to acquire the structure in FIG. 2.

As shown in FIG. 3, in one embodiment, the cutting line 111 is provided at the top of the display screen 100, and may certainly be provided at the bottom of the display screen 100 or other locations. The cutting line 111 is curved, and is a non-closed curve as seen from the top, such as at least one of a right-angled rectangle lacking one side, a trapezoid lacking one lacking, and a rounded rectangle lacking one lacking. When the display screen 100 is in a bent state, both the primary display screen 10 and the secondary display screen 20 are in a bent state, so that the area defined by the cutting line 111 forms an opening 112.

Figure 4:
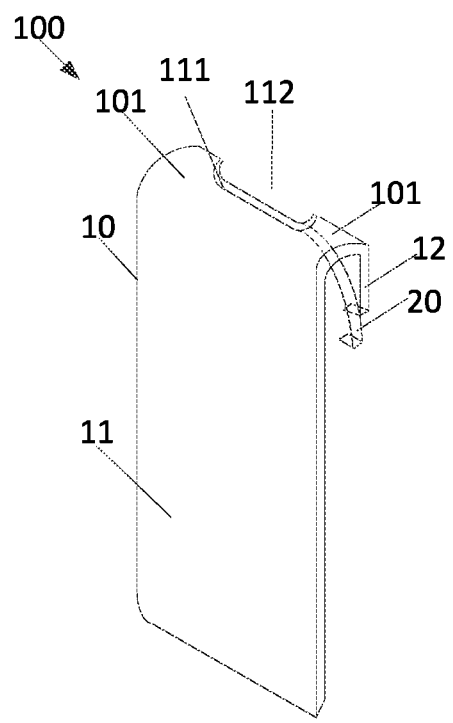
FIG. 4 is a schematic structural view of the display screen in FIG. 2.
Figure 5:
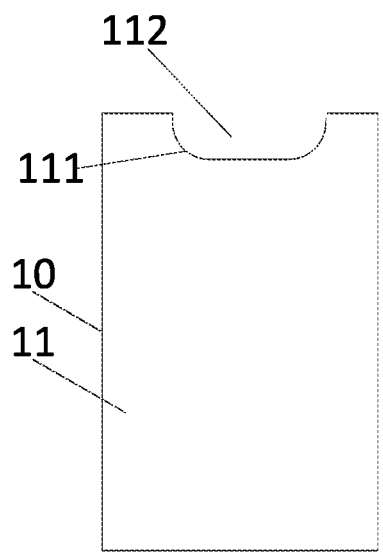
FIG. 5 is a front view of the display screen in FIG. 4.

As shown in FIG. 4, the primary display screen 10 includes a first portion 11 disposed on the first surface and a second portion 12 extending from a portion connected to the first portion 11 to the second surface. The second portion 12 is connected to a portion of the first portion 11. For example, the bending may be performed along a predetermined bending line 113 to acquire the first portion 11 and the second portion 12. In one embodiment, the predetermined bending line 113 is provided in the middle of the area surrounded by the cutting line 111.

The primary display screen 10 is provided with an opening 112 disposed, for example, in a notch area at the top of the primary display screen 10. More particularly, the opening 112 is disposed in a curved portion between the first portion 11 and the second portion 12. The opening 112 is formed by a region defined by the cutting line 111. In one embodiment, both the first portion 11 and the second portion 12 are provided with openings. In other words, as seen from both the front and the back of the display screen 100, the primary display screen 10 is provided with a notch at the top.

In one embodiment, to further increase the display area, the opening 112 is provided at the top of the primary display screen 10. In other words, the opening 112 is provided on the curved portion 101 of the primary display screen 10. In other words, the opening 112 is provided on the curved portion 101 between the first portion 11 and the second portion 12. Certainly, it can be understood that the position of the opening 112 is not limited to the top of the primary display screen 10. For example, the entire opening 112 may be provided on the front surface of the primary display screen 10 or the entire opening may be provided on the back side of the primary display screen 10. In other words, the opening 112 is provided at the top or the bottom of the display screen 100.

In one embodiment, the curved portion 101 on both sides of the opening 112 is provided with touch keys disposed thereon. For example, the touch keys are provided on the curved portion 101 on the left and the right sides of the opening 112. The touch keys may be volume keys, home keys, etc., and may also include commonly used virtual keys.

Returning to FIG. 1, in one embodiment, the electronic device further includes a function module 30 disposed corresponding to the opening 112. In one embodiment, the function module 30 may include at least one of a first camera module 31, a second camera module (not shown), an earpiece 32, and a sensor element 33. For example, in one embodiment, the function module 30 includes a first camera module 31, an earpiece 32, and a sensor element 33. More particularly, the first camera module 31 includes a camera (a front camera), a flash unit, and the like. In another embodiment, the function module 30 may further include a second camera module. The second camera module includes at least one camera (rear camera) and a flash unit. More particularly, the flash unit includes a plurality of light sources, and the flash unit surrounds an outer circumference of the at least one camera to form an annular light-emitting area.

In one embodiment, the second portion 12 is provided with at least one of a fingerprint recognition module and an input unit disposed thereon. Certainly, the second portion 12 can be provided with touch keys disposed thereon. In addition, the second camera module can also be disposed on the second portion 12.

In one embodiment, as shown in FIG. 2 or FIG. 4, one side of the secondary display screen 20 is connected to the remaining portion of the first portion 11. In other words, one side of the secondary display screen 20 is integrated with the first portion 11 in one piece. The first portion 11 and the second portion 12 are connected at both sides. In other words, the first portion 11 and the second portion 12 are partially connected. One side of the secondary display screen 20 and the remaining portion of the first portion 11 (the portion not connected to the second portion 12, for example, the central portion of the first portion 11) are connected as one piece. One side of the secondary display screen 20 is integrated with the portions of the first portion 11 and the second portion 12 that are not connected. Returning to FIG. 1, in a planar state, the second portion 12 surrounds the secondary display screen 20, and the other sides of the secondary display screen 20 are spaced apart from the corresponding sides of the second portion 12. The secondary display screen 20 is bent from a first surface of a portion connected to corresponding sides of the first portion 11 to the second surface.

In other words, the secondary display screen 20 is bent from the front surface of the portion not connected to the first portion 11 and the second portion 12 to the back surface. The width of the secondary display screen 20 is smaller than the width of the primary display screen 10.

The joint between the secondary display screen 20 and the first portion 11 is disposed on a missing side of the rectangular cutting line 111, such that the uppermost (top) side of the secondary display screen 20 and the top of the first portion 11 is connected. The lowermost (bottom) side of the secondary display screen 20 is bent to the back of the display screen 100.

As shown in FIG. 4, the portion connected to the secondary display screen 20 and the primary display screen 10 is disposed in a central portion at the top of the first portion 10. The second portion 12 extends from edge regions on two sides of the first portion 11 to the second surface. In other words, the second portion 12 is joined to the edge regions on the two sides of the first portion 11. The edge regions are disposed on one of the two sides of the portion connected to the primary display screen 10 and the secondary display screen 20. In other words, the second portion 12 extends from the first portion 11 on both sides of the opening 112 to the back surface. More particularly, the opening 112 is provided between the two edge regions.

Figure 6:
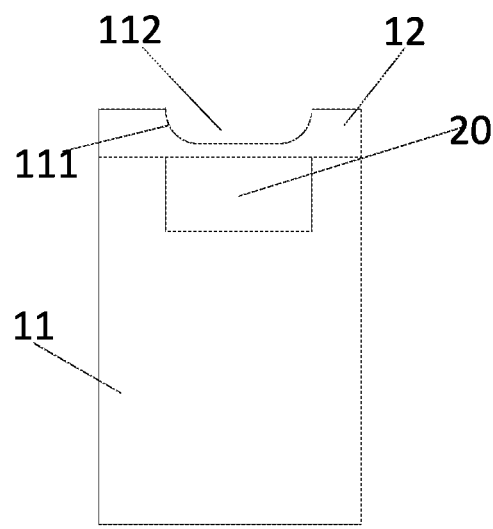
FIG. 6 is a rear view of the display screen in FIG. 4.

As shown in FIG. 4 or FIG. 6, an end portion of the second portion 12 distant from the first portion 11 abuts the secondary display screen 20. In other words, the end of the second portion 12 abuts the secondary display screen 20 on the back side of the display screen 100.

It can be understood that, in another embodiment, the left side or the right side of the secondary display screen 20 is integrated with the corresponding side of the first portion 11. In still another embodiment, one side of the secondary display screen 20 is integrated with the second portion 12. For example, the top end of the secondary display screen 20 is integrated with the top end of the second portion 12, and the bottom end of the secondary display screen 20 and the bottom end of the second portion 12 are bent to the back surface of the display screen 100. Meanwhile, the second portion 12 and the secondary display screen 20 partially overlap.

It can be understood that the display area of the display screen 100 includes the primary display screen 10 and the secondary display screen 20.

Figure 7:
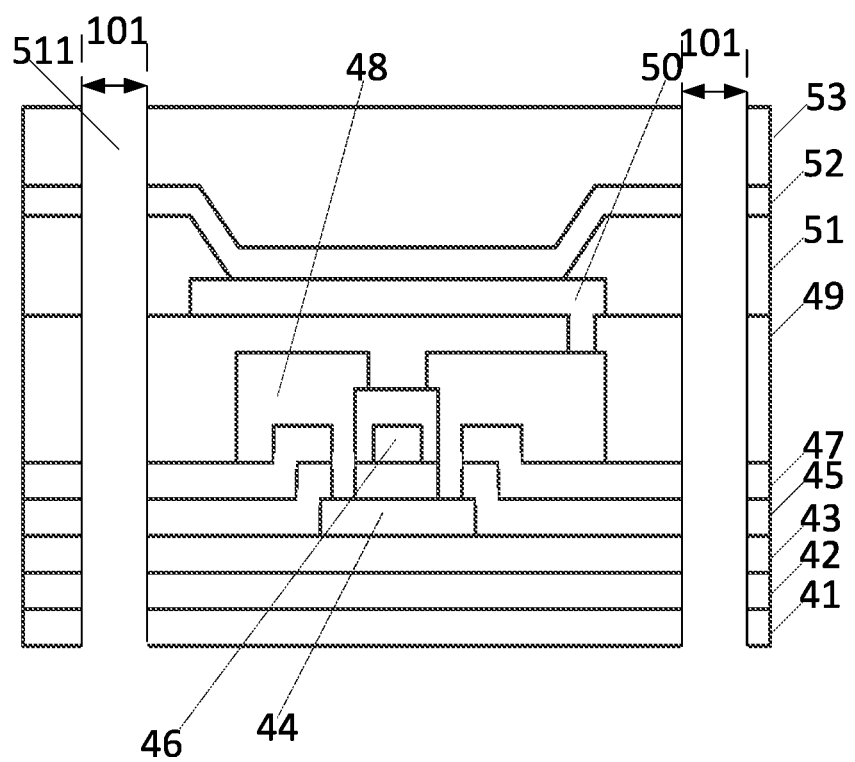
FIG. 7 is a cross-sectional view showing a first step of a method for manufacturing a display screen according to the present invention.

As shown in FIG. 7, the method for manufacturing the display screen of the present invention includes the following steps:

In Step S101, a switch array layer and an organic light-emitting display layer are sequentially formed on the flexible substrate.

For example, as shown in FIG. 7, the method for manufacturing the switch array layer includes sequentially forming a buffer layer 42, a barrier layer 43, an active layer 44, an interlayer dielectric layer 45, a gate 46, a gate insulating layer 47, a second metal layer 48, and a first interlayer dielectric layer 49 on a flexible substrate 41. The material of the buffer layer 42 and the barrier layer 43 is at least one of SiNx and SiOx. The active layer 43 is configured to form a channel.

The specific manufacturing process is as follows: a first metal layer is first formed on the interlayer dielectric layer 45, and the first metal layer is patterned by a mask to form the gate 46.

The method may further include: patterning the gate insulating layer 47 to form a source hole and a drain hole. The source is connected to the active layer 44 through the source hole, and the drain is connected to the active layer 44 through the drain hole.

Thereafter, a second metal layer is formed on the gate insulating layer 47 and in the source hole and drain hole, and the second metal layer 48 is patterned to form the source and the drain.

The method for manufacturing the organic light-emitting display layer includes sequentially forming an anode, a pixel defining layer, an organic light-emitting layer, and a cathode on the first interlayer dielectric layer 49.

The method may further include: patterning the first interlayer dielectric layer 49 to form a connection hole, forming a conductive layer on the first interlayer dielectric layer 49 and in the connection hole, and patterning the conductive layer to form the anode 50. The drain is connected to the anode 50 through the connection hole.

Thereafter, the pixel defining layer 51 is formed on the anode, the pixel defining layer 51 is patterned to form spaced-apart pixel defining units, and the organic light-emitting layer 52 is formed between the pixel defining units and on some of the pixel defining units.

For example, an organic light-emitting layer including, for example, R, G, B light-emitting materials is evaporated using a fine metal mask (FMM), and then a cathode 53 is formed on the organic light-emitting layer. Thereafter, a via 511 is formed in a pre-determined area 101 (i.e., the position where the cutting line is provided). The via 511 is configured to divide the primary display screen 10 and the secondary display screen 20. It can be understood that FIG. 7 only shows the longitudinal cross-sectional view to separate the left and right sides of the secondary display screen 20 from the primary display screen 10, i.e., to form a vertical cutting line. The horizontal cutting line (configured to separate the top of the secondary display screen 20 from the primary display 10) can be similarly provided.

In Step S102, a first packaging layer is formed on the display panel.

Figure 8:
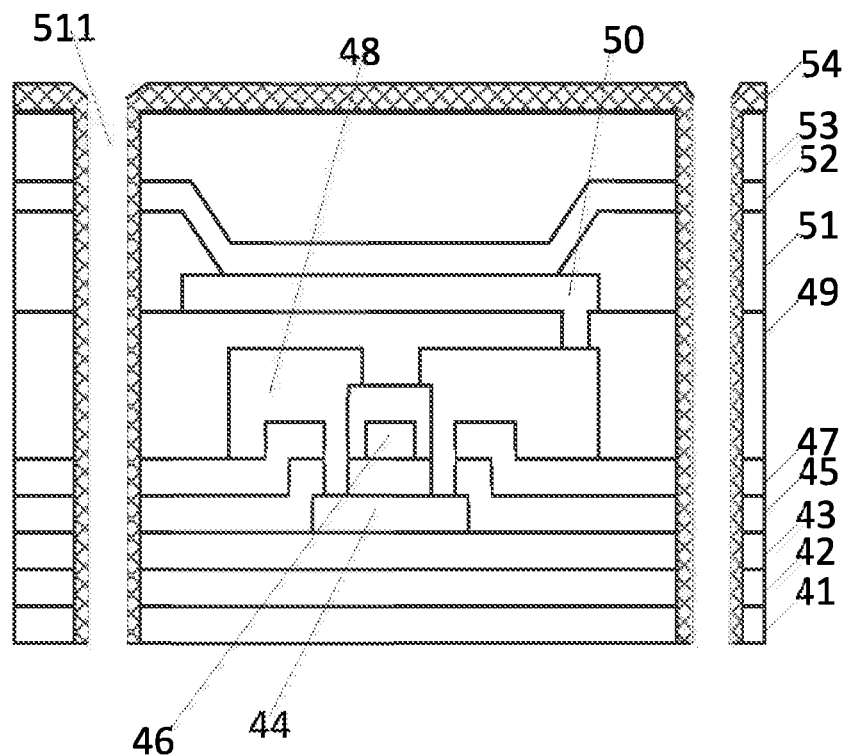
FIG. 8 is a cross-sectional view showing a second step of a method of manufacturing a display screen according to the present invention.

For example, as shown in FIG. 8, the first packaging layer 54 is deposited on the cathode 53 and in the via 511. The cross-sectional structure of the first packaging layer 54 may show a single layer structure or a multilayer structure. The material of the first packaging layer 54 includes at least one of SiNx, SiON, and SiO.

The electronic device of the present invention may be an electronic apparatus such as a mobile phone, a tablet computer, or a wearable device.

In the electronic device according to the present invention, the entire display screen is divided into a primary display screen and a secondary display screen. The primary display screen and the secondary display screen are bent backward, so that both the front and rear screens after bending are used for display. In other words, a display area is added to the back surface of the display, which increases the total display area and achieves high screen ratio display.

In the present specification, the description with reference to the terms "one embodiment", "some embodiments", "illustrative embodiment", "example", "specific example", or "some examples", etc. means that particular features, structures, materials or characteristics described in the embodiments or examples are included in at least one embodiment or example of the present invention. In the present specification, the schematic representation of the above terms does not necessarily mean the same embodiment or example. Moreover, the particular features, structures, materials, or characteristics described may be combined in a suitable manner in any one or more embodiments or examples.

While the embodiments of the present invention have been shown and described, one of ordinary skill in the art can understand that various changes, modifications, substitutions and changes can be made to the embodiments without departing from the spirit and scope of the present invention. The scope of the present invention is defined by the claims and their equivalents.

What is claimed is:

1. An electronic device, comprising:
   a display screen provided with a first surface and a second surface arranged oppositely, the display screen comprising:
   a primary display screen comprising a first portion disposed on the first surface and a second portion extending from a portion connected to the first portion to the second surface, wherein the second portion is connected to a portion of the first portion; and
   a secondary display screen connected to a remaining portion of the first portion, the secondary display screen being bent from a first surface of the portion connected to the first portion to the second surface, one side of the secondary display screen being connected to the remaining portion of the first portion, and the width of the secondary display screen being smaller than the width of the primary display screen;

wherein the remaining portion of the first portion is a portion not connected to the second portion.

2. The electronic device according to claim 1, wherein the portion connected to the first portion and the secondary display screen is disposed in a central portion at the top of the first portion, the second portion extends from edge regions on two sides of the first portion to the second surface, and the edge regions are disposed on one of the two sides of the portion connected to the primary display screen and the secondary display screen.

3. The electronic device according to claim 2, wherein the primary display screen is provided with an opening disposed between the edge regions.

4. The electronic device according to claim 3, wherein the opening is disposed in a curved portion between the first portion and the second portion.

5. The electronic device of claim 4, further comprising a function module disposed corresponding to the opening, the function module comprising at least one of a first camera module, a second camera module, an earpiece, and a sensor element.

6. The electronic device according to claim 4, wherein the curved portion on both sides of the opening is provided with touch keys disposed thereon.

7. The electronic device according to claim 3, wherein the opening is disposed at the top or the bottom of the display screen.

8. The electronic device according to claim 1, wherein an end portion of the second portion distant from the first portion abuts the secondary display screen.

9. An electronic device, comprising:
a display screen provided with a first surface and a second surface arranged oppositely, the display screen comprising:
a primary display screen comprising a first portion disposed on the first surface and a second portion extending from a portion connected to the first portion to the second surface, wherein the second portion is connected to a portion of the first portion; and
a secondary display screen connected to a remaining portion of the first portion, the secondary display screen being bent from a first surface of the portion connected to the first portion to the second surface;

wherein the remaining portion of the first portion is a portion not connected to the second portion.

10. The electronic device according to claim 9, wherein one side of the secondary display screen is connected to the remaining portion of the first portion.

11. The electronic device according to claim 9, wherein the portion connected to the first portion and the secondary display screen is disposed in a central portion at the top of the first portion, the second portion extends from edge regions on two sides of the first portion to the second surface, and the edge regions are disposed on one of the two sides of the portion connected to the primary display screen and the secondary display screen.

12. The electronic device according to claim 11, wherein the primary display screen is provided with an opening disposed between the edge regions.

13. The electronic device according to claim 12, wherein the opening is disposed in a curved portion between the first portion and the second portion.

14. The electronic device according to claim 12, further comprising a function module disposed corresponding to the opening, the function module comprising at least one of a first camera module, a second camera module, an earpiece, and a sensor element.

15. The electronic device according to claim 13, wherein the curved portion on both sides of the opening is provided with touch keys disposed thereon.

16. The electronic device according to claim 9, wherein the opening is disposed at the top or the bottom of the display screen.

17. The electronic device according to claim 9, wherein an end portion of the second portion distant from the first portion abuts the secondary display screen.

18. The electronic device according to claim 9, wherein the width of the secondary display screen is smaller than the width of the primary display screen.

* * * * *